United States Patent [19]

Fukui

[11] Patent Number: 4,625,858

[45] Date of Patent: Dec. 2, 1986

[54] HARNESS ASSEMBLING APPARATUS

[75] Inventor: Takeshi Fukui, Kanazawa, Japan

[73] Assignee: Tokai Electric Wire Company Limited, Mie, Japan

[21] Appl. No.: 704,198

[22] Filed: Feb. 22, 1985

Related U.S. Application Data

[63] Continuation-in-part of Ser. No. 432,841, Oct. 5, 1982, abandoned.

[30] Foreign Application Priority Data

Oct. 7, 1981 [JP] Japan ................................ 56-160826

[51] Int. Cl.[4] ................................................ B65G 37/00

[52] U.S. Cl. ................................ 198/465.1; 198/474.1

[58] Field of Search .................. 198/345, 465.1, 465.2, 198/465.3, 803.01, 803.2, 474.1, 802, 375; 29/742, 749, 753, 759, 857

[56] References Cited

U.S. PATENT DOCUMENTS

| | | | |
|---|---|---|---|
| 2,903,120 | 9/1959 | Thomas | 198/472 |
| 3,133,622 | 5/1964 | Immesberger | 198/472 |
| 3,315,778 | 4/1967 | Kendall, Sr. et al. | 198/472 |
| 3,578,187 | 5/1971 | Stribick | 198/472 |
| 3,642,158 | 2/1972 | Koennecke et al. | 198/472 |
| 3,809,208 | 5/1974 | Shields | 198/472 |
| 3,931,882 | 1/1976 | Ossbahr | 198/648 |
| 4,267,918 | 5/1981 | Steinbrecher | 198/472 |

FOREIGN PATENT DOCUMENTS

| | | | |
|---|---|---|---|
| 2756422 | 6/1979 | Fed. Rep. of Germany | 198/472 |
| 3111706 | 1/1982 | Fed. Rep. of Germany | 198/472 |
| 564482 | 6/1957 | Italy | 198/472 |
| 11034 | 3/1977 | Japan . | |
| 87617 | 6/1980 | Japan . | |
| 145925 | 11/1980 | Japan | 198/472 |
| 80/00559 | 4/1980 | PCT Int'l Appl. | 198/472 |

*Primary Examiner*—Joseph E. Valenza
*Assistant Examiner*—Kyle E. Shane
*Attorney, Agent, or Firm*—Ernest A. Beutler

[57] ABSTRACT

Two embodiments for a harness assembling apparatus having a conveyor system including a forward conveyor line and a backward conveyor line, and a plurality of pallets each having a deck carrying a plurality of jigs for laying the harness thereon. The pallets are adapted to run successively along the forward conveyor line and then along the backward conveyor line. The apparatus has a turning and shifting device. Each shifting device is adapted to shift successive pallets from one conveyor line to the other conveyor line one by one. The turning device turns the edge of the deck located at the lower side on the one conveyor line to the upper side when located on the other conveyor line. In one embodiment, the turning and shifting devices are combined into a single unit, while in the other embodiment, the turning device is a separate unit from the shifting device.

15 Claims, 9 Drawing Figures

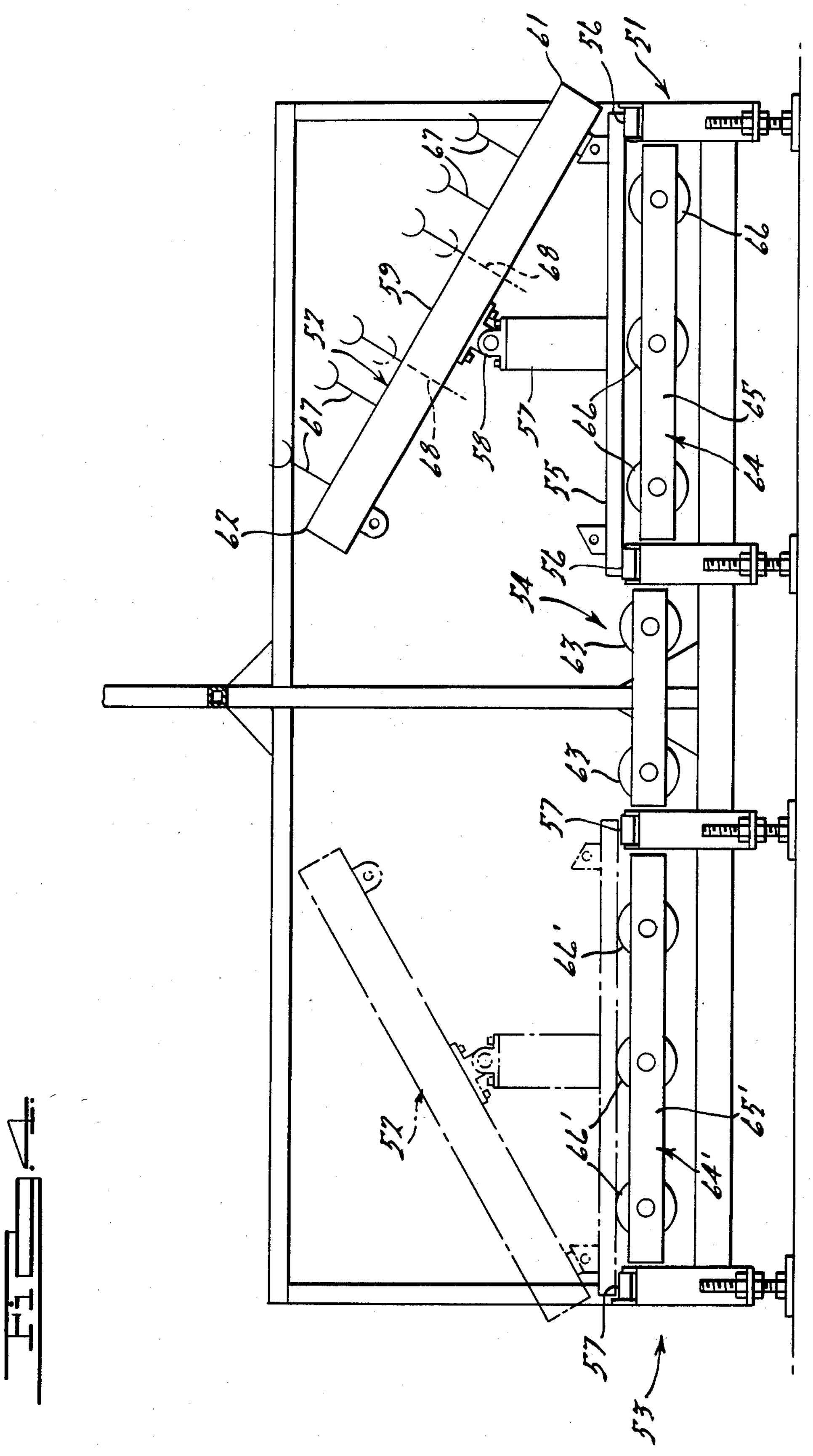
61
56
51
67
59
52
68
58
57
55
66
65
64
62
54
63
66'
65'
64'
53

HARNESS ASSEMBLING APPARATUS

CROSS-REFERENCE TO RELATED APPLICATION

This application is a continuation-in-part of my application of the same title, Ser No. 432,841, filed Oct. 5, 1982, now abandoned, and assigned to the assignee of this application.

BACKGROUND OF THE INVENTION

The present invention relates to improvements in conveyor systems suited to the assembling of combinations of electric wires for internal wiring in an electric appliance, the combinations of wires being generally referred to as a harness. Particularly, the invention is concerned with improvements in conveyor systems of the kind stated above, suited particularly for handling wire harnesses of great lengths.

DESCRIPTION OF THE PRIOR ART

The assembling of harnesses is done on pallets which run on a circulating conveyor as is known from Japanese Patent Publication No. 11034/77 and Japanese Utility Model Laid-open No. 87617/80. When the wire harnesses to be assembled have great length, the whole length of each harness is laid on a plurality of pallets or decks to reduce the length of the individual pallets in the direction of travel of the pallets thereby to reduce the curvature at each corner of the path of the circulating conveyor. This type of harness assembling system, however, suffers various problems. For instance, in such a system employing a plurality of pallets, the distance between adjacent pallets varies depending upon the position of the conveyor which is undesirable because it causes a fluctuation in the position of mounting or fitting of parts on the harness. In addition, it is necessary to preserve a large space between adjacent pallets in order to absorb a change in the distance between such pallets at the corners of the path of the conveyor, so that the mounting of parts is often made difficult due to the presence of such a large gap between adjacent pallets.

To obviate these problems, it has been proposed to use a single elongated pallet. Such a long pallet, however, requires a large curvature at the corner of path of the conveyor resulting in an uneconomically large space required for arranging the conveyor. This gives rise to the demand for a conveyor system having a forward conveyor line and a backward conveyor line arranged in a side-by-side fashion. In general, the number of branch circuits shunting from the main line of the harness is increased as the overall length of the harness is increased. The main line is assembled in the direction of travel of the pallet along the conveyor while the branching lines are assembled substantially perpendicularly to the main line.

In consequence, the worker engaged in the assembling is obliged to take the trouble of assembling branch lines at the upper side and lower side of the main line. Particularly, the assembling along the upper edge of the deck is difficult to conduct.

SUMMARY OF THE INVENTION

Accordingly, it is primary object of the invention to provide a harness assembling apparatus in which the deck surface is turned substantially upside down when the pallet is shifted from the forward conveyor line to the backward conveyor line so that the assembling work along the upper edge of the pallet deck, which is difficult to conduct in the forward running of the conveyor, is made easily along the lower edge of the deck in the backward running of the pallet.

More specifically, it is an object of the invention to provide a harness assembling apparatus in which the deck on the pallet is turned substantially upside down at the end of each run of the conveyor thereby to facilitate the attaching of branch circuits.

It is another object of the invention to provide a harness assembling apparatus in which the pallet is turned substantially upside down at the end of each run of the conveyor to permit the completion of assembling work in one cycle of running of the conveyor including forward and backward runs, thereby to simultaneously achieve both of reduction in length of the conveyor and reduction in distance between two conveyor lines.

It is still another object of the invention to provide a harness assembling apparatus in which the inclination angle of the deck is changed in such a manner as to permit a rational distribution or sharing of the assembling works to the upper edge side of the deck and the lower edge side of the deck thereby to facilitate the assembling work as a whole.

It is a further object of the invention to provide a harness assembling apparatus in which jigs for supporting the harness on the deck are retractable from the plane of the deck thereby to facilitate the taping of the harness.

It is a still further object of the invention to provide a harness assembling apparatus in which the lower edge of the deck is made substantially flush with the outer side wall of the conveyor line to permit a smooth running of the branching circuits suspended from the deck.

To these ends, according to one aspect of the invention, there is provided a harness assembling apparatus having a conveyor system including a forward conveyor line and a backward conveyor line, and a plurality of pallets each having a deck carrying a plurality of jigs for laying the harness thereon, the pallets are adapted to run successively along the conveyor system, charaterized by comprising a shifting device provided to shift successive pallets from one conveyor line to the other conveyor line one by one. In addition, a turning arrangement is employed so that the edge of the deck located at the lower side when on the one conveyor line is located at the upper side when on the other conveyor line.

These and other objects, features and advantages of the invention will become clear from the following description of the preferred embodiments taken in conjunction with the accompanying drawings.

BRIEF DESCRIPTION OF THE DRAWINGS

FIG. 4 is an enlarged side view of the conveyor system shown in FIG. 3 looking from the left-hand side thereof.

DESCRIPTION OF THE PREFERRED EMBODIMENTS

Figure 1:
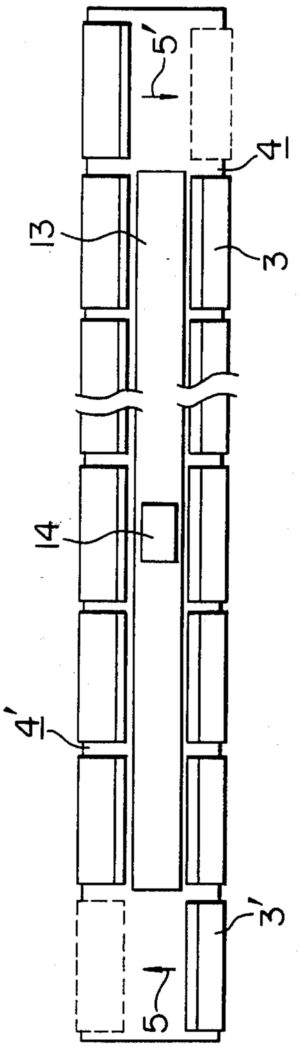
FIG. 1 is a schematic plan view of conveyor system incorporated in a harness assembling apparatus in accordance with a first embodiment of the invention.
Figure 2:
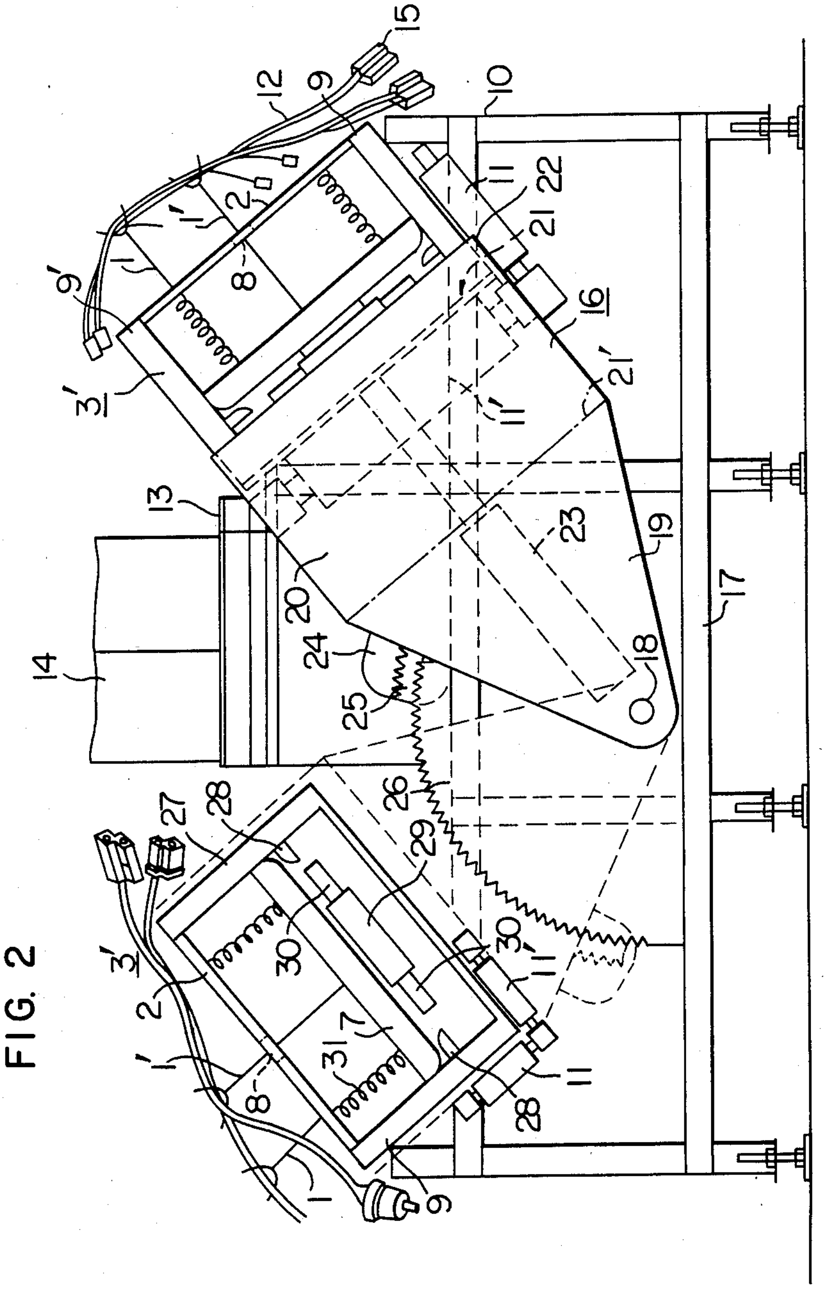
FIG. 2 is an enlarged side view of the conveyor system shown in FIG. 1 as viewed from the left side in FIG. 1.

Embodiments Of FIGS. 1 And 2

Referring first to FIG. 1, there is shown schematically a conveyor system which is generally referred to as tact type conveyor including two conveyor lines: Namely, a forward conveyor line 4 and a backward conveyor line 4′ each of which having rollers 11, 11′ (see FIG. 2) on which a plurality of pallets 3 are conveyed in sequence starting from the right-hand end of the forward conveyor line 4 as viewed in FIG. 1. The pallets 3 are adapted to make stops at successive working stations where workers are stationed to attach harness wires 12 onto jigs 1, 1′. The pallet 3′ which has reached the left-side end of the forward conveyor line 4 is then shifted to the backward conveyor line 4′ shown at the upper side of FIG. 1 by a turning and shifting device 5 which is represented by an arrow 5 in FIG. 1 disposed at the downstream end, i.e. left-side end, of the forward conveyor line 4. The pallets shifted to the backward conveyor line 4′ is then driven while supported on the rollers 11, 11′ to successive working stations where the assembling operations are done by workers. The pallet which has reached the downstream end, i.e. the right-side end of the backward conveyor line 4′ as viewed in FIG. 1, is then shifted back to the forward conveyor line by another turning shifting device 5′ at the same time when the pallet 3′ of left-side end of the forward conveyor line 4 is shifted to the backward conveyor line 4′ by the first mentioned turning shifting device 5. A platform 13 disposed between two conveyor lines 4, 4′ carries various devices such as a harness circuit tester 14 and a later-mentioned taping device (not shown) and various parts necessitated by respective working stations are furnished on this platform 13. A series of operations are conducted along this conveyor system to complete the assembling of the wire harness. This series of operations includes attaching of harness lines 12, terminals, connectors 15, grommets and so forth, bundling of lines, sheathing or taping of line bundles and electric performance test are conducted. This tact type conveyor is known per se so that detailed description of the conveyor system itself is omitted from this specification.

The harness assembling apparatus of this embodiment of the invention is characterized by the adoption of a novel turning shifting device 5.

An example of such a turning shifting device will be explained in detail with specific reference to FIG. 2.

The aforementioned pallet 3′, which has been moved to the left-side end of the forward conveyor line 4 as viewed in FIG. 1, is shown in the right-side part of FIG. 2. The pallet 3′ is held by a shifting container generally designated at a numeral 16. The shifting container 16 includes two container legs 19 pivotally carried by a shaft 18 fixed to the base 17 of the conveyor, a container box 20 carried by the container legs 19 and provided with a large opening at the reverse side of the sheet of FIG. 2, i.e. at the right side as viewed in FIG. 1, and a container bottom 21 which is movable up and down within the container box 20. Before the pallet 3′ is moved to the left-side end station in the forward conveyor line 4 from the preceding station, the vacant shifting container 16 having no pallet is stationed at the position shown in the right-side part in FIG. 2 to wait for the pallet 3. Then, the pallet 3 runs on the rollers 11, 11′ shown in the right-side part in FIG. 2 and slides on the container bottom 21 and the side wall 22 of the stationed container 16 aligned with the rollers 11, 11′ so as to be supported by the container bottom 21 and the side wall 22. When the assembling in this station is completed, compressed air in a pneumatic cylinder 23 fixed to the container leg 19 is released so that the container bottom 21 is lowered to the position shown by a chain line 21′ and, accordingly, the pallet 3′ is lowered. Subsequently, a motor 24 attached to the container leg 19 is started to rotate a worm gear which meshes with a stationary rack 26 fixed to the base 17 of the conveyor, so that the container box 20 holding the pallet 3′ is turned and shifted from the right position shown by full line in FIG. 2 to the left position, i.e. to the backward conveyor line 4′, shown by broken line in the same figure where the rollers 11, 11′ shown at the left-side part in FIG. 2 are waiting for this pallet 3′. It will be seen that, in this new position, the portion of the pallet 3′ which has been located at the upper side in the forward conveyor line 4 is now located at the lower side of the backward conveyor line 4′ to facilitate the assembling work at such portion of the pallet 3′. As will be clearly seen from FIG. 2, during the running of the pallet 3′ along the forward conveyor line 4, the lower corner portion 9 of the upper deck 2 is held substantially flush with the outer side wall 10 of the conveyor so as to prevent the wires 12 and connectors 15 carried by the jigs 1, 1′ from being caught by stationary parts such as the base 17 of the conveyor. Similarly, in the backward running, the corner portion 9′ of the pallet 3′ is held substantially flush with the outer side wall of the conveyor to prevent catching of lines 12 and connectors 15.

In the forward running of the pallet 3′ along the conveyor, the working surface of an upper deck 2 of the pallet is held at a larger inclination with respect to the horizontal plane than in the backward running to make accessible the area near the upper corner portion 9′ thereby to permit a larger number of assembling steps to be performed in the forward running than in the backward running. Namely, it is preferred to finish as much working steps as possible while the pallet is on the forward conveyor line 4 because the backward running along the backward conveyor line 4′ must have portions alloted for final works such as electric circuit test, sheathing of harness and so forth.

The harness assembling process includes a taping step which is conducted for winding insulating tape around the bundle of the lines 12 in the final part of the process. In the main line portion of the harness, the winding of the tape is made over the entire length of the harness. In such a case, the movement of the tape roll through the space between the deck surface and the lines 12 is often hindered by the presence of the jigs 1, 1′. To obviate this problem, the jigs 1′ are retracted by moving a lower deck 7 of the pallet 3' downward while leaving only the jigs 1 necessary for the taping. This selective retraction of the jigs 1, 1' is achieved by the following mechanism. Namely, the jigs 1 necessary for supporting the lines 12 during taping are supported by the upper deck 2, while other jigs 1' are supported by the lower deck 7 and extended upward through apertures 8 formed in the upper deck. The lower deck 7 is movable up and down while being guided by four guide posts 27 provided at the corners of the pallet 3. The lower deck 7 is normally biased by springs 31 to rest on retractable projections 28 protruded inwardly from the posts 27 and having rounded upper edges of the lower deck 7. The arrangement is such that, as a pneumatic cylinder 29 disposed below the lower deck 7 is ativated to extend its two pistons 30 outwardly, the piston rods 30 urge and depress corresponding projections 28 so that the lower deck 7 is lowered by the force of the springs 31 while sliding on the upper edges of the projections 28, so that the jigs 1' carried by the lower deck 7 are retracted to facilitate the taping as stated before.

Embodiment Of FIGS. 3 Through 9

In the embodiment of FIGS. 1 and 2, the individual pallets 3 wre shifted from the forward conveyor line 4 to the backward conveyor line 4' and turned so that the portion of the pallets located at the upper side of the forward conveyor line 4 are located at the lower side of the backward conveyor line 4' and vice versa by a combined turning and shifting device. In addition, a plurality of jigs 1' of the embodiment of FIGS. 1 and 2 were all operated simultaneously between their lowered and raised positions through connection to a common lower deck 7. In the embodiment of FIGS. 3 through 9, the shifting and turning functions are provided by different elements rather than a combined element and certain of the jigs are independently movable between a raised and lowered position. Thus, in some regards, the embodiment of FIGS. 3 through 9 may be considered to be a simplification of the embodiment of FIGS. 1 and 2.

Figure 3:
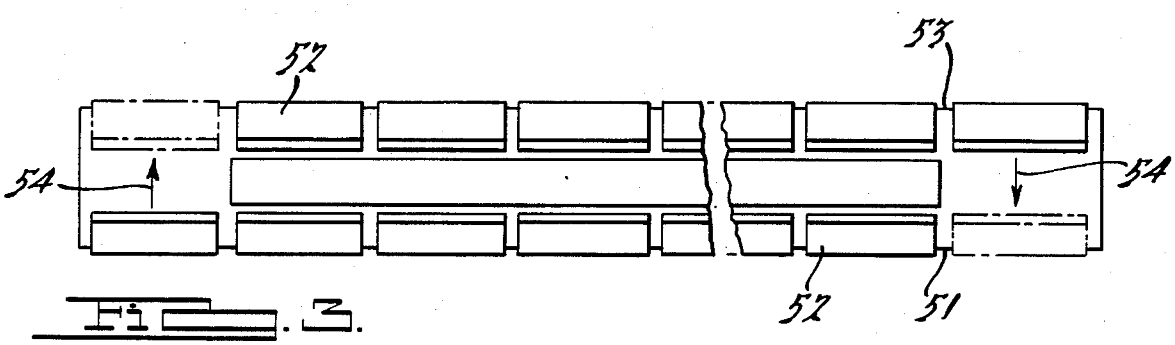
FIG. 3 is a schematic plan view of a conveyor system incorporated in a harness assembling apparatus in accordance with a second embodiment of the invention.

Referring now to the drawings and first to FIG. 3, a forward conveyor line is indicated generally by the reference numeral 51 and is adapted to move pallets 52 in a station-by-station sequence along the line in a linear manner. Adjacent to and spaced from the foward conveyor line 51 is a rearward conveyor line 53 wherein pallets 52, which have been transferred from the conveyor line 51 to the conveyor line 53, are moved in a rearward direction in a step-by-step manner from station to station. At each end of the lines 51 and 53, these is provided a respective shifting device, indicated by the reference numeral 54 (arrows in FIG. 3), for transferring the pallets 52 between the lines 51 and 53. At the left-hand end of the assembly as shown in FIG. 3, the shifting device will shift pallets from the conveyor line 51 to the conveyor line 53. At the right-hand or beginning end, the shifting device 54 returns pallets 52 from the conveyor line 53 to the conveyor line 51.

Referring now to FIG. 4, the individual pallets 52 each comprise a base plate 55 that is slidably supported for movement along the respective conveyor lines 51 and 53 by means of pairs of longitudinally extending rollers 56 (conveyor line 51) and 57 (conveyor line 53). A central post or stanchion 99 is affixed in a suitable manner to the base plates 55 of the pallets 52. A pivotal joint 58 carried at the upper end of the stanchion 99 journals a deck 59 upon the base plate 55 for the turning movement about an axis that extends parallel to the lines 51 and 53. The turning movement is such that when a pallet 52 is on the conveyor line 51, one edge 61 is disposed lowermost and closer to workers positioned along this conveyor line. The opposite edge 62 is raised and away from the workers on the conveyor line 51. When the pallets 52 are transferred by the shifting device 54 to the conveyor line 53, the decks 59 of the pallets 52 are pivoted so that the edges 62 will be positioned at the lower edge and adjacent to workers stationed along the conveyor line 53. At this time, the edge 61 will be raised and away from the workers adjacent the conveyor line 53. As with the previously described embodiment, the angle of inclination of the decks 59 along the line 51 may be steeper than along the line 53, if desired. In addition, regardless of the angular position, the respective edges 61 or 62 of the decks 59 are positioned adjacent the rollers 56 or 57 at the outer sides of the respective conveyor lines 51 or 53 so as to prevent the likelihood of exposed wires becoming tangled with th conveyor lines.

The deck 59 is balanced so that its own internal weight will hold it in either angular position. An operator positioned at the end of either or both conveyor lines may conveniently pivot the deck 59 between its two positions, as shown in the solid and phantom line views in FIG. 4.

The shifting device 54 comprises a first series of vertically fixed rollers 63 that are journalled for rotation about an axis that extends parallel to the line of actions of the conveyors 51 and 53 at the ends of each of the conveyors and between them. The fixed rollers 63 are positioned at a slightly higher level than the roller 56 of the conveyor 51 and the rollers 57 and the conveyor 53.

At each end of the conveyor 51 there are also provided vertically movable roller assemblies 64 comprises of a supporting frame 65 and a plurality of rollers 66 that are, like the rollers 63, journalled for rotation about an axis that extends parallel to the line of action of the conveyor 51. The vertically movable roller assembly 64 is movable between a retracted position, as shown at the right-hand side of FIG. 4, wherein the bases 55 of the pallet assemblies 52 may move freely across their tops on the rollers 66 and a raised position, as shown in phantom at the left-hand side of FIG. 3. This vertical movement may be achieved by means of any suitable type of device, such as by means of pneumatic or hydraulic cylinder assemblies (not shown). The corresponding vertically movable roller assembles associated at the ends of the conveyors 53 are identified by the same reference numerals with a prime added.

The shifting of the pallets 52 from the conveyor line 51 to the conveyor line 53 will now be described by reference to FIG. 4. When a pallet 52 is delivered by the conveyor 51 to the station where the shifting device 54 is located, an operator will first ensure that there is no pallet in the corresponding space on the conveyor 53. At this time, the operator energizes the lifting roller assembly 64, 64' at each side of the conveyor assembly simultaneously so that the rollers 66, 63 and 66' will all lie in the same horizontal plane. This can be done through a common powering source for the aforedescribed lifting devices. Conveniently, the same operator may then pivot the deck 59 from the position wherein the edge 61 is lowermost to a position wherein the edge 62 is lowermost. The balancing of the deck 59 is such that this pivotal movement may be easily accomplished. It should be noted that it is desirable to achieve this turning from the side adjacent the conveyor 51 since the lower edge 61 of the deck 59 is more accessible to an operator at this station. Once the turning has been accomplished, the operator merely rolls the complete pallet assembly 52 from a position in proximity to the conveyor 51 to a position in proximity to the conveyor 53. The lifting roller assemblies 64 and 64' are then lowered so that the base 55 will then be supported on the roller assemblies 57 of the conveyor 53.

Transfer from the conveyor 53 to the conveyor 51 is achieved in an opposite manner and preferably from an operator located at the station adjacent the conveyor 53 for the same reasons as aforedescribed.

As with the previous embodiment, the deck 59 carries a first series of fixed jigs 67 that are supported in a fixed vertical position relative to the deck 59. In addition, there is a second series of vertically adjustable jigs 68. Unlike the previous embodiment, however, the jigs 68 are not all operated simultaneously, but may be individually moved by an operator from a lowered position, as shown in the phantom line view of FIG. 4 and a raised position, as shown in the solid line view of this figure.

Referring now to FIGS. 5 through 9, the jigs 68 include a cylindrical post 69 having a fork-shaped portion 71 at their upper ends and above the deck 59 so as to support an appropriate portion of the harness. The portion 69 is supported for sliding movement relative to the deck 59 by means of a bushing 72 that is externally threaded and is locked in place by a nut 73. A locking or latching assembly, indicated generally by the reference numeral 74 is provided for selectively retaining the jigs 68 in their raised position. The latching assembly 74 includes a plate 75 that is fixed relative to the deck 59 and in which a vertically extending slot 76 is formed. A pin 77 is affixed to the jig portion 69 and extends into the slot 76.

The latch 74 also includes a latching member 78 that is supported for pivotal movement on the plate 75 by means of a pivot pin 79. The pin 79 supports the latching member 78 for pivotal movement about an axis defined by the center of the pin 79 and which is perpendicular to the plate 75. The connection between the pin 79 and the latching member 78 is also such that the latching member 78 may pivot or move about a plane that extends perpendicularly to this plane and parallel to the plate 78, for a reason to be described.

A combined tension and compression spring 81 has one of its ends 82 affixed in an opening in the plate 75 and its other end captured in a tang 83 formed on the latching member 78. The spring 81 urges the latching member 78 axially in a direction against the plate 75 and also rotationally in a counterclockwise direction, as viewed in FIGS. 5, 7 and 8, so that it will engage with a stop pin 84 carried by the plate 75.

The latching member 78 has a locking opening 85 that is formed at the upper end of a cam-shaped section 86. An upstanding projection 87 is formed inwardly of the opening 85 and cooperates with a downwardly extending projection 88 so as to hold the device in a locking position, as will be described. The upper edge of the opening 85 is formed with a cam-shaped portion 89 inwardly of the locking projection 88. An outwardly extending tang 91 is formed at the lower end of the cam-shaped portion 89 inwardly of the projection 87.

Figure 5:
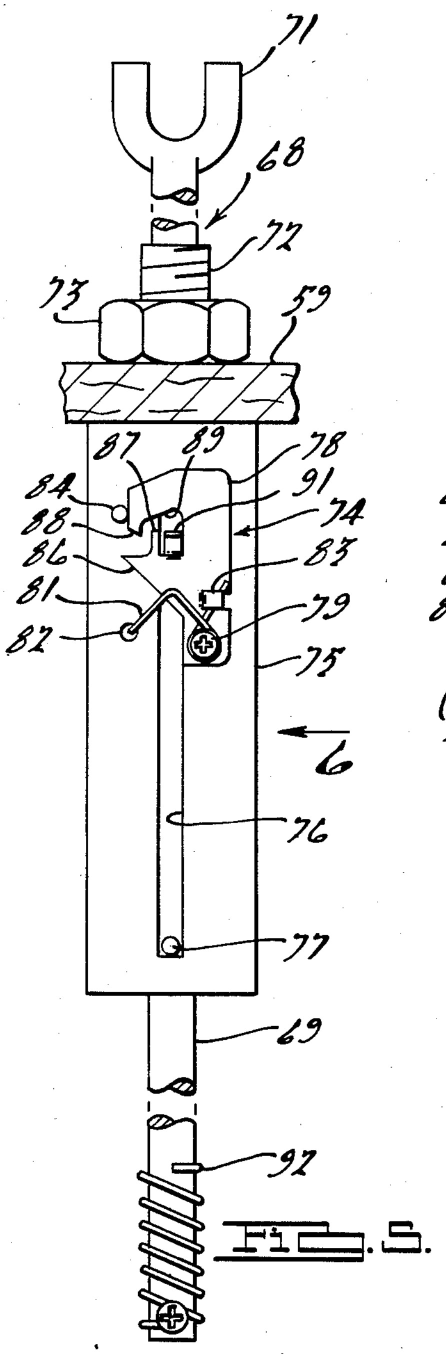
FIG. 5 is an enlarged side elevational view of one of the jigs associated with this embodiment, shown in its lower position.
Figure 6:
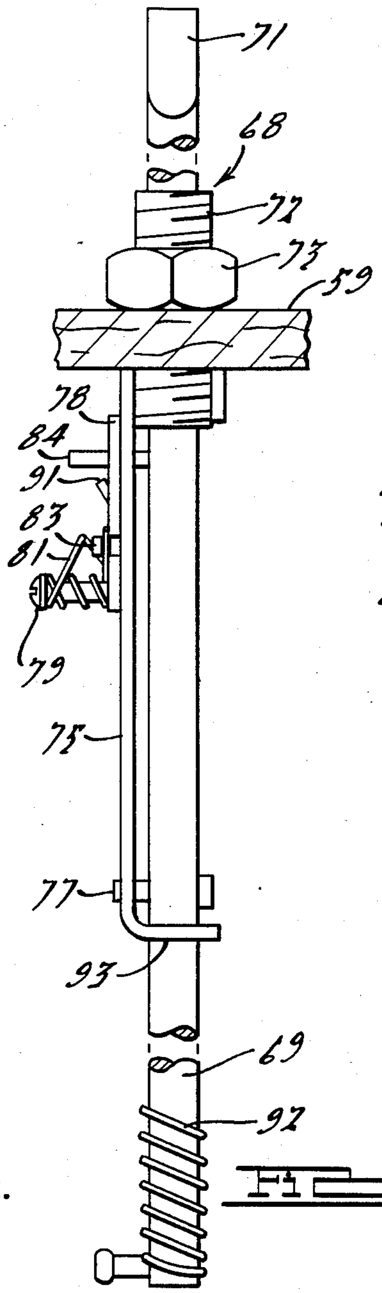
FIG. 6 is an end view taken in the direction of the arrow 6 in FIG. 5.
Figure 7:
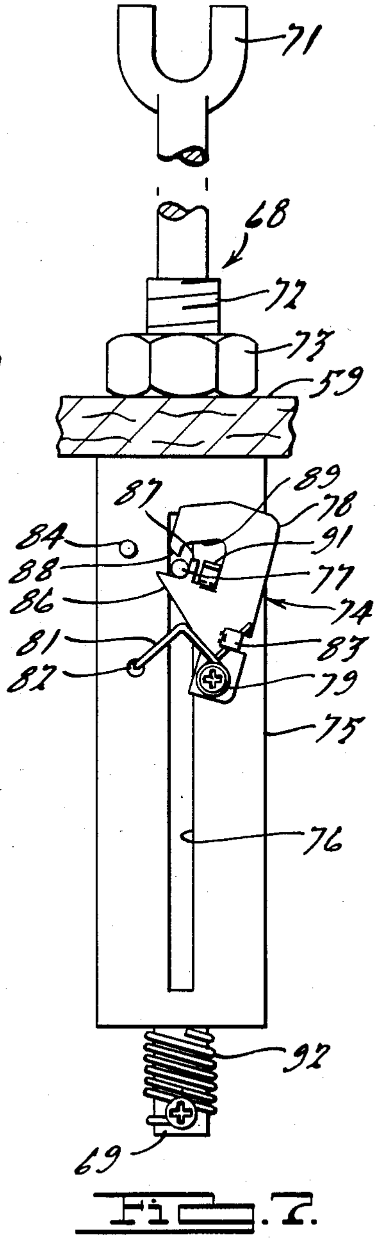
FIG. 7 is a side elevational view, in part similar to FIG. 5, showing the jig in its upwardly extended and locked position.

FIG. 5 shows the jig 68 in a retracted position wherein the pin 77 is at the bottom end of the slot 76 and the latching member 78 is held in the position shown in this figure against the pin 84. If it is desired to raise the jig 68 so that its fork-shaped portion 71 is in an elevated position so as to hold an associated harness, an operator pulls the jig 68 upwardly. The pin 77 then traverses the slot 76 and engages the cam surface 86 of the latcing member 78 so as to pivot it in a clockwise direction against the action of the spring 81. When the pin 77 reaches the opening 85, the spring 81 will cause the latching member 78 to pivot in the counterclockwise direction, as shown in FIG. 7, so that the pin 77 is engaged by the projection 87 and the jig 68 will be locked in its upwardly extending position. At this time, a coil compression spring 92 extending around the lower end of the jig cylindrical portion 69 will be compressed against an inwardly extending flange 93 of the plate 75.

Figure 8:
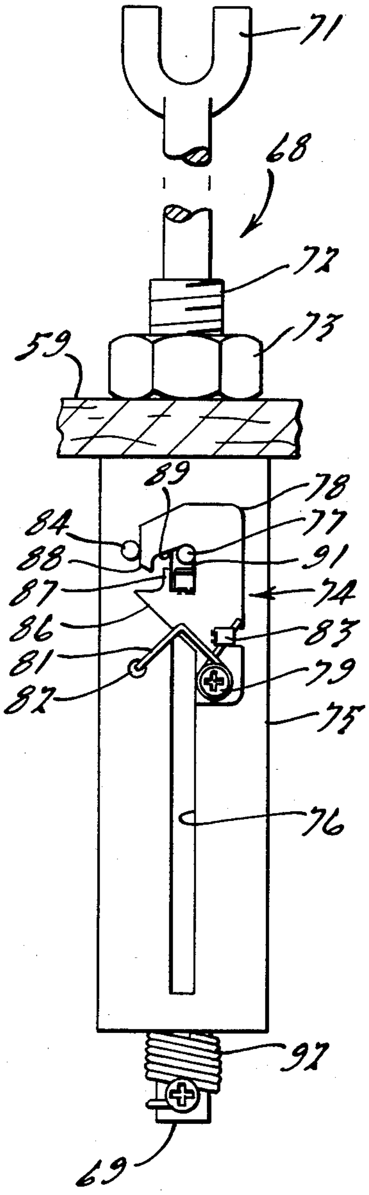
FIG. 8 is a view, in part similar to FIGS. 5 and 7, showing the jig in its released position for return to its lowered position.
Figure 9:
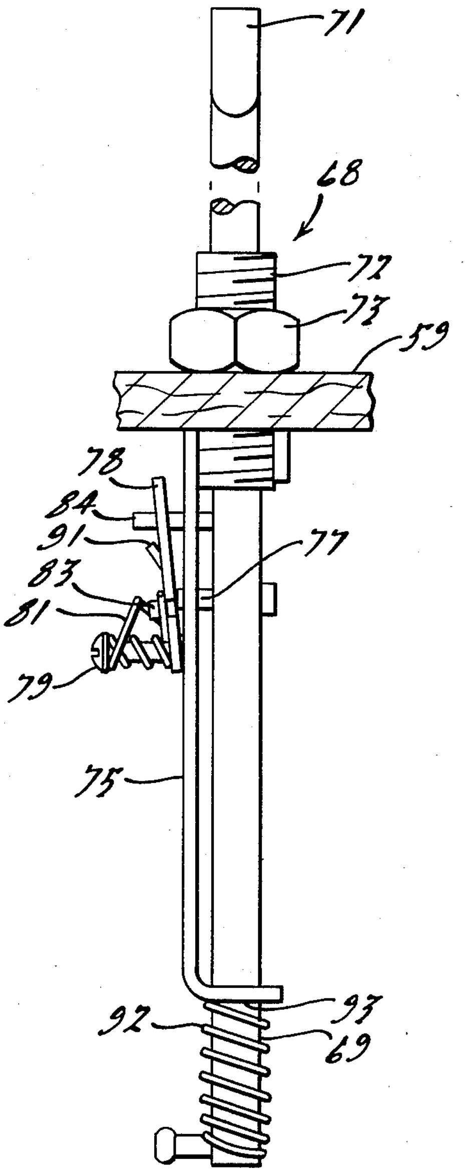
FIG. 9 is a side elevational view, in part similar to FIG. 6, and shows the operation as the jig is lowered.

If it is desired to lower the jig 68 from the position shown in FIG. 7, an operator first pulls the jig 68 upwardly further compressing the spring 92. During this upward movement, the pin 77 will engage the cam surface 89 and clear the projection 87 so that the spring 81 may urge the locking member 78 back to the position in engagement with the pin 84 (FIG. 8). At this time, the pin 77 will be positioned above the tang 91 and, upon downward movement of the jig 68, the pin 77 will engage the tank 91 and effect pivotal and/or axial movement of the latching member 78 about a horizontally disposed axis so that the cam surface 89 will be spaced outwardly from the pin 77 and the jig 68 may be moved downwardly (FIG. 9).

As with the embodiment of FIGS. 1 and 2, various assembly and testing steps may be performed at the various stations along the conveyors 51 and 53. Because only the turning and shifting devices of this embodiment differ from those of the previous embodiment, these additional steps will not be described since it is believed that those skilled in the art will clearly understand them.

From the foregoing description, it will be understood that the harness assembling apparatus of each embodiment of the invention affords a remarkable improvement in the efficiency of the harness asembling work while permitting more effecient use of the space in the factory, i.e. a higher space factor.

Although the invention has been described through specific terms, the described embodiments are only illustrative and various changes and modifications are possible without departing from the scope of the invention, as set forth in the appended claims.

What is claimed is:

1. A harness assembling apparatus having a conveyor system including a forward conveyor line and a parallel backward conveyor line, and a plurality of pallets each having an upper deck carrying a plurality of jigs for supporting a harness thereon, said jigs including at least one fixed jig carried by said upper deck of the pallet in a fixed vertical position relative to said upper deck and at least one movable jig supported for vertical movement relative to said upper deck between a lowered position and a raised position, a lower deck supporting said movable jig, said movable jig supported by said lower deck being extended to the upper side of said upper deck through an aperture formed in said upper deck, said lower deck being movable up and down relatively to said upper deck for effecting vertical movement thereof, said pallets being supported in said conveyor lines with their decks inclined to the horizontal and driven successively along said conveyor lines between work stations for assembling and testing harnesses, characterized by comprising a turning a shifting device provided at least one of the downstream ends of said conveyor lines, said turning and shifting device being adapted to shift successive pallets from one conveyor line to the other conveyor line one by one and including a turning device for pivoting said decks in such a manner that the edge of said deck located at the lower side on said one conveyor line is located at the upper side on said other conveyor line.

2. A harness assembling apparatus according to claim 1, wherein a turning and shifting device is disposed at the downstream end of each conveyor line.

3. A harness assembling apparatus according to claim 1, wherein the angle of inclination of the upper deck with respect to the horizontal plane while said pallet is on said forward conveyor line is different from that obtained while said pallet is on said backward conveyor line.

4. A harness assembling apparatus according to claim 3, wherein the angle of inclination of the upper deck with respect to the horizontal plane is smaller in said backward conveyor line than in said forward conveyor line.

5. A harness assembling apparatus according to claim 1, wherein the turning and shifting devices comprise a single element.

6. A harness assembling apparatus according to claim 5, wherein the turning and shifting device comprises a shifting conveyor supported for pivotal movement about an axis disposed between the conveyor lines for simultaneously pivoting and shifting pallets from one conveyor line to the other.

7. A harness assembling apparatus according to claim 1, wherein the turning and shifting device comprises conveyor means for conveying the pallets horizontally from one conveyor line to the other.

8. A harness assembling apparatus according to claim 1, wherein the turning device comprises means for pivotally supporting the upper and lower decks of the individual pallets upon a base plate thereof, which base plate is adapted to be supported upon the conveyor lines.

9. A harness assembling apparatus according to claim 8, wherein the turning and shifting device comprises conveyor means for conveying the pallets horizontally from one conveyor line to the other.

10. A harness assembling apparatus according to claim 1, wherein the movable jig is manually operable between its raised and lowered positions.

11. A harness assembling apparatus according to claim 1, wherein the lower corner portion of said upper deck is maintained substantially flush with the outer side wall of said conveyor system while said pallet is running along said forward conveyor line.

12. A harness assembling apparatus according to claim 6, wherein the angle of inclination of the upper deck with respect to the horizontal plane while said pallet is on said forward conveyor line is different from that obtained while said pallet is on said backward conveyor line.

13. A harness assembling apparatus according to claim 6, wherein the lower corner portion of said upper deck is maintained substantially flush with the outer side wall of said conveyor system while said pallet is running along said forward conveyor line.

14. A harness assembling apparatus according to claim 8, wherein the lower corner portion of said upper deck is maintained substantially flush with the outer side wall of said conveyor system while said pallet is running along said forward conveyor line.

15. A harness assembling apparatus according to claim 9, wherein the lower corner portion of said upper deck is maintained substantially flush with the outer side wall of said conveyor system while said pallet is running along said forward conveyor line.

* * * * *